US008569677B2

(12) United States Patent
Gessner et al.

(10) Patent No.: US 8,569,677 B2
(45) Date of Patent: Oct. 29, 2013

(54) DEVICES USEFUL FOR VACUUM ULTRAVIOLET BEAM CHARACTERIZATION INCLUDING A MOVABLE STAGE WITH A TRANSMISSION GRATING AND IMAGE DETECTOR

(75) Inventors: Oliver Gessner, Albany, CA (US); Oleg A. Kornilov, Berlin (DE); Russell B. Wilcox, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 142 days.

(21) Appl. No.: 12/843,773

(22) Filed: Jul. 26, 2010

(65) Prior Publication Data

US 2011/0180696 A1 Jul. 28, 2011

Related U.S. Application Data

(63) Continuation of application No. PCT/US2009/031899, filed on Jan. 23, 2009.

(60) Provisional application No. 61/023,773, filed on Jan. 25, 2008.

(51) Int. Cl.
*H01J 3/14* (2006.01)
*H01J 5/02* (2006.01)

(52) U.S. Cl.
USPC .......................... 250/216; 250/239; 250/234

(58) Field of Classification Search
USPC ............ 250/237 G, 214.1, 214 R, 208.1, 216, 250/227.18, 227.2, 226, 237 R, 234, 214 VT, 250/207, 458.1, 503.1, 239, 201.9; 359/211.6, 211.1, 211.2, 209.1, 204.5, 359/563; 356/305, 328, 334, 335, 342, 343, 356/73, 336, 337, 338; 378/43, 63; 369/112, 44.113
See application file for complete search history.

(56) References Cited

U.S. PATENT DOCUMENTS

| 3,919,562 | A | * | 11/1975 | Whitman | 250/570 |
|---|---|---|---|---|---|
| 4,945,527 | A | * | 7/1990 | Sunagawa | 369/44.12 |
| 5,016,265 | A | * | 5/1991 | Hoover | 378/43 |
| 5,450,463 | A | * | 9/1995 | Iketaki | 378/43 |
| 5,533,083 | A | * | 7/1996 | Nagai et al. | 378/44 |
| 5,674,743 | A | * | 10/1997 | Ulmer | 435/287.2 |
| 6,529,533 | B1 | * | 3/2003 | Voss | 372/29.01 |
| 6,624,424 | B2 | * | 9/2003 | Eckert et al. | 250/372 |
| 6,636,297 | B2 | * | 10/2003 | Wakabayashi et al. | 356/51 |
| 7,067,819 | B2 | * | 6/2006 | Janik | 250/372 |
| 7,315,561 | B2 | * | 1/2008 | Haji et al. | 372/58 |
| 2002/0027936 | A1 | * | 3/2002 | Govorkov et al. | 372/57 |
| 2005/0220266 | A1 | * | 10/2005 | Hirsch | 378/43 |

OTHER PUBLICATIONS

Written Opinion for International Application No. PCT/US09/31899 mailed Mar. 10, 2009.

(Continued)

*Primary Examiner* — Que T Le
*Assistant Examiner* — Jennifer Bennett
(74) *Attorney, Agent, or Firm* — Lawrence Berkeley National Laboratory

(57) ABSTRACT

The invention provides for a device comprising an apparatus comprising (a) a transmission grating capable of diffracting a photon beam into a diffracted photon output, and (b) an image detector capable of detecting the diffracted photon output. The device is useful for measuring the spatial profile and diffraction pattern of a photon beam, such as a vacuum ultraviolet (VUV) beam.

15 Claims, 11 Drawing Sheets

(56) References Cited

OTHER PUBLICATIONS

VonDrasek et al., "Efficient monochromator to isolate VUV light generated by four-wave mixing techniques," Applied Optics 27, No. 19, Oct. 1, 1988, pp. 4057-4061.

Kornilov, O., Wilcox, R. & Gessner, O. Nanograting-based compact vacuum ultraviolet spectrometer and beam profiler for in situ characterization of highorder harmonic generation light sources. Rev. Sci. Instrum. 81, 063109 (2010).

L. Poletto, S. Bonora, M. Pascolini, and P. Villoresi, Rev. Sci. Instrum. 75, 4413 (2004).

L. Poletto, P. Villoresi, F. Frassetto, F. Calegari, F. Ferrari, M. Lucchini, G. Sansone, and M. Nisoli, Rev. Sci. Instrum. 80, 123109 (2009).

T. A. Savas, S. N. Shah, M. L. Schattenburg, J. M. Carter, and H. I. Smith, J. Vac. Sci. Technol. B 13, 2732 (1995).

T. A. Savas, M. L. Schattenburg, J. M. Carter, and H. I. Smith, J. Vac. Sci. Technol. B 14, 4167 (1996).

* cited by examiner

DEVICES USEFUL FOR VACUUM ULTRAVIOLET BEAM CHARACTERIZATION INCLUDING A MOVABLE STAGE WITH A TRANSMISSION GRATING AND IMAGE DETECTOR

CROSS-REFERENCES TO RELATED APPLICATIONS

This application claims benefit as a continuation application of PCT International Application No. PCT/US2009/31899, filed Jan. 23, 2009, which claims priority to U.S. Provisional Application Ser. No. 61/023,773, filed Jan. 25, 2008, the disclosures of which are incorporated by reference in their entireties.

STATEMENT OF GOVERNMENTAL SUPPORT

The invention described and claimed herein was made in part utilizing funds supplied by the U.S. Department of Energy under Contract No. DE-AC02-05CH11231. The government has certain rights in this invention.

FIELD OF THE INVENTION

This invention relates generally to the characterization of vacuum ultraviolet (VUV) light sources.

BACKGROUND OF THE INVENTION

Currently, the characterization of vacuum ultraviolet (VUV) light sources involves several technical problems. The main problem is the need to simultaneously satisfy the tight space restrictions for the setup while preserving the functionality of each mode and the convenient switching capability between different operating modes. Current practice always involves major changes to the light source assembly in order to switch between characterizing the VUV beam and using the VUV beam for its intended purpose. There is no device available that can readily switch between a spectrometer and beam profiling mode in the VUV photon energy regime "at the push of a button". These two characteristics of the VUV photon beam usually have to be measured by two independent devices or several components of the experimental setup have to be altered one-by-one in order to switch between the different modes. There is no device available that fulfill these needs.

SUMMARY OF THE INVENTION

The invention provides for a device comprising an apparatus comprising (a) a transmission grating capable of diffracting a photon beam into a diffracted photon output, and (b) an image detector capable of detecting the diffracted photon output. The device is useful for measuring the spatial profile and diffraction pattern of a photon beam.

The invention also provides for a device comprising an apparatus comprising (a) a transmission grating capable of diffracting a photon beam into a diffracted photon output, (b) an image detector capable of detecting the diffracted photon output, and (c) a stage wherein the transmission grating and the image detector are each connected to the stage.

The invention also provides for a device comprising: an apparatus comprising (a) a transmission grating capable of diffracting a photon beam into a diffracted photon output, (b) an image detector capable of detecting the diffracted photon output, (c) a vertical slit aperture, and (d) a stage wherein the transmission grating, the image detector and the vertical slit aperture are each connected to the stage: and whereby the photon beam passes through the vertical slit aperture prior to diffraction by the transmission grating.

The invention further provides for a vacuum assembly comprising a vacuum chamber, a light source and the device of the present invention, wherein the apparatus of the device is located in the vacuum chamber.

The invention further provides for a method for characterizing a vacuum ultraviolet (VUV) beam, comprising: (a) generating a VUV beam, (b) providing a device of the present invention, and (c) recording the diffracted photon output detected by the image detector.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
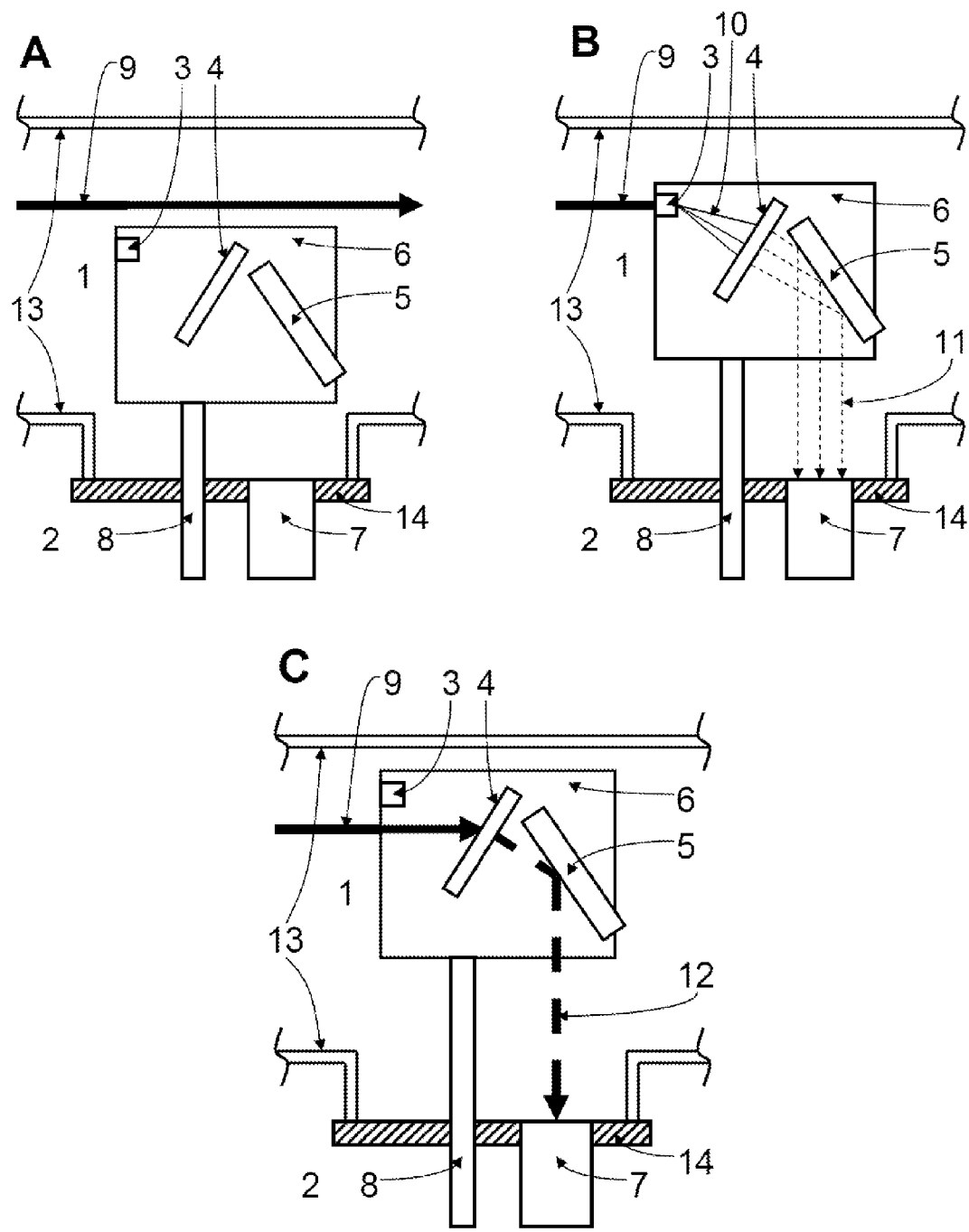
FIG. 1 shows three operating modes of a device of the present invention. Panel A shows the apparatus out of the way of the photon beam. Panel B shows the apparatus in a mode diffracting the photon beam and recording the diffracted photon beam. Panel C shows the apparatus in a mode recording the spatial intensity profile of the photon beam.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a support bar" includes a plurality of such support bars, and so forth.

These and other objects, advantages, and features of the invention will become apparent to those persons skilled in the art upon reading the details of the invention as more fully described below.

The Device

The invention provides for a device comprising an apparatus comprising (a) a transmission grating capable of diffracting a photon beam into a diffracted photon output, and (b) an image detector capable of detecting the diffracted photon output. The device is useful for measuring the spatial profile and diffraction pattern of a photon beam.

The invention also provides for a device comprising an apparatus comprising (a) a transmission grating capable of diffracting a photon beam into a diffracted photon output, (b) an image detector capable of detecting the diffracted photon output, and (c) a stage wherein the transmission grating and the image detector are each connected to the stage.

The invention also provides for a device comprising: an apparatus comprising (a) a transmission grating capable of diffracting a photon beam into a diffracted photon output, (b) an image detector capable of detecting the diffracted photon output, (c) a vertical slit aperture, and (d) a stage wherein the transmission grating, the image detector and the vertical slit aperture are each connected to the stage: and whereby the photon beam passes through the vertical slit aperture prior to diffraction by the transmission grating.

The invention further provides for a vacuum assembly comprising a vacuum chamber, a light source and the device of the present invention, wherein the apparatus of the device is located in the vacuum chamber.

The invention further provides for a method for characterizing a vacuum ultraviolet (VUV) beam, comprising: (a) generating a VUV beam, (b) providing a device of the present invention, and (c) recording the diffracted photon output detected by the image detector.

In some embodiments, the transmission grating and the image detector are positioned in a fixed configuration relative to each other. The fixed configuration is maintained during the use of the device.

In some embodiments, the photon beam is a vacuum ultraviolet (VUV) beam produced by a VUV light source. In some embodiments, during use of the device, the apparatus is in-vacuum.

In some embodiments, the image detector comprises one or more multi-channel plate (MCP) and a phosphor screen, wherein the phosphor screen is capable of converting the diffracted photon output into a visible image.

In some embodiments, the stage is a breadboard. In some embodiments, the stage is moveable in both directions in at least one dimension. In some embodiments, the position or location of the stage controlled by a controller. The stage and the controller can be connected by a support, such as a support bar. The controller can be a piezo actuator. The stage can be a piezo driven linear stage.

In some embodiments, the apparatus is in a vacuum and the stage is controlled from outside the vacuum.

In some embodiments, the device further comprises an image recorder capable of recording the visible image. In some embodiments, the image recorder is a camera.

In some embodiments, the apparatus further comprises a reflective surface which is positioned such that the reflective surface directs the visible image to the image recorder. In some embodiments, the reflective surface is a mirror.

In some embodiments, the device comprises an apparatus which is an in-vacuum assembly, and an atmosphere-side assembly, wherein the in-vacuum assembly and the atmosphere-side assembly are mounted on opposite sides of a vacuum flange. The in-vacuum assembly comprises the (a) a transmission grating capable of diffracting a photon beam into a diffracted photon output, (b) an image detector capable of detecting the diffracted photon output, and (c) a stage wherein the transmission grating and the image detector are each connected to the stage. In some embodiments, the vacuum flange is a 10" Conflat® ultrahigh vacuum flange.

Figure 2:
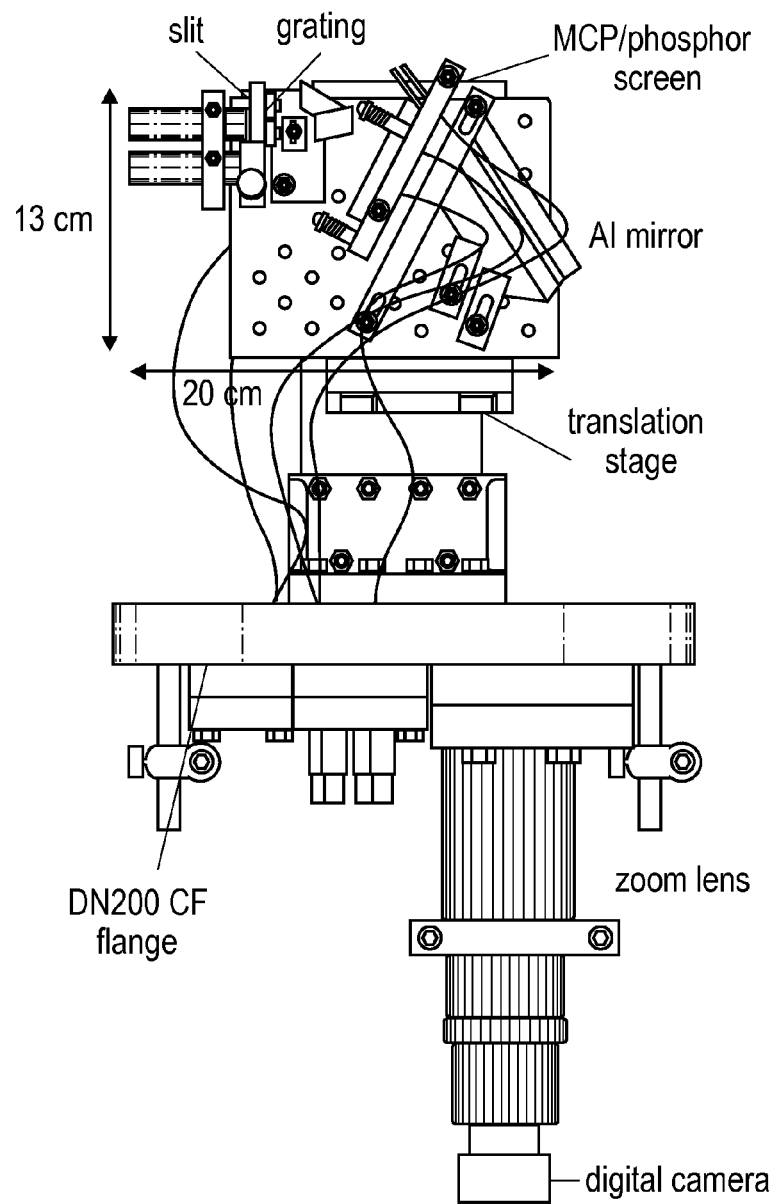
FIG. 2 shows a device of the present invention. In this particular embodiment, it is a VUV spectrometer and beam profiler device mounted on a DN200 CF flange

In some embodiments of the invention, the device comprises an ultracompact, high-sensitivity spectrometer and beam profiler for in-situ VUV beam characterization as shown in FIG. 2.

The In-Vacuum Assembly

The apparatus is also known as the in-vacuum assembly. The in-vacuum assembly can be constructed using the following described method. One or more support bars can be mounted to the vacuum-side of the 10" Conflat® ultrahigh vacuum flange. A 2 inch travel range linear translation stage (436, Newport, Irvine Calif., USA, modified for vacuum compatibility) is mounted on top of the support bar. The horizontal position of the upper part of the translation stage can be varied from the atmosphere-side by means of a 2 inch travel range vacuum-compatible Picomotor™ actuator (8303-V, New Focus, San Jose Calif., USA) which is powered through two wires connected to vacuum-feedthroughs. An optical breadboard (MB612, Thorlabs, North Newton N.J., USA, cut to fit) is mounted on top of the translation stage. The breadboard supports all optical- and detector components of the in-vacuum assembly. Thus, the entire optical- and detector in-vacuum assembly can be moved over a range of 2 inch while under vacuum. The axis of travel is perpendicular to the 10" diameter surface of the Conflat® flange (see FIGS. 1 and 2) this axis is vertical. The components of the in-vacuum assembly are a vertical slit aperture (such as a S50R; commercially available from Thorlabs, North Newton N.J., USA), a transmission grating (commercially available from nm²-LLC, Cambridge Mass., USA), an imaging detector (such as a BOS-40-IDA-CH-32358-2; commercially available from Beam Imaging Solutions, Longmont Colo., USA) and a reflective surface (such as a 75J00ER.3 plane mirror, commercially available from Newport Corp., Irvine Calif., USA). In some embodiments, the slit aperture is laser machined with a rectangular open area of 50 µm width and ~3.8 mm height. In some embodiments, the transmission grating is a free-standing, 10.000 lines/mm, lithographically etched silicon nitride transmission grating, supported by bar structure with a ~5 µm period. The one or more support bars that support the in-vacuum assembly can run perpendicular to the grating lines. In some embodiments, the imaging detector comprises a stack of two microchannel-plates (MCP) (such as Long-Life™ rimless MCP-10, 25 µm pore size, 60:1 aspect ratio; commercially available from BURLE/Photonis, Sturbridge Mass., USA) mounted in chevron configuration in front of a phosphor screen (such as an Aluminized P-20 standard; commercially available from Beam Imaging Solutions, Longmont Colo., USA). The image detector can have a circular active area of at least 44 mm diameter. In some embodiments, the reflective surface has a reflectivity of >84% reflectivity over 400-10,000 nm range. The mirror can be cut to size from a Utility Broadband Enhanced Aluminum Mirror (>84% reflectivity over 400-10,000 nm range).

The Flange

In some embodiments of the invention, the apparatus or in-vacuum assembly which during use is in-vacuum or is located in a vacuum, and the image recorder and controller of the stage which are located in the atmosphere or out of the vacuum are separated by a flange. In some embodiments, the flange is a 10" Conflat® flange. The flange may support all other parts of the spectrometer. As seen in FIG. 2, electrical vacuum feedthroughs for the Picomotor™ powering as well as for the imaging detector high voltage supply are mounted on 2.75" Conflat® flanges on top of the main flange. The flat mirror of the in-vacuum assembly and the 4" Conflat® viewport projects the image on the backside (phosphor screen) of the imaging detector onto a CCD camera which is mounted on the atmosphere-side of the spectrometer.

The Atmosphere-Side Assembly

The device can further comprise a 6× zoom lens (such as a Zoom 7000; commercially available from Navitar Inc., Rochester N.Y., USA) that is able to cover a working distance of at least 140-280 mm which can image the phosphor screen onto the image recorder, such as a CCD camera (such as a EO-1312M; commercially available from Edmund Optics, Barrington N.J., USA). The focus can be adjusted manually to compensate for the translational motion of the in-vacuum assembly. The CCD camera can be read out by a standard PC via a USB port.

Method of Use

In some embodiments of the invention (see FIG. 1), the device comprises an apparatus comprising a transmission grating (3), an image detector (4), and a reflective surface (5) in which all three are connected or affixed to a stage (6). The transmission grating (3), the image detector (4) and the reflective surface (5) are configured or positioned such that when the photon beam in the chamber strikes the image detector (either diffracted as shown in Panel B or not diffracted as in Panel C) the resultant visible image formed on the image detector is reflected from the reflective surface (5) towards a recorder (7). The stage is capable of moving into three different positions (represented in Panels A-C of FIG. 1). The apparatus is located in space (1) within a chamber (the walls of which are indicated by (13)) that can be rendered into a vacuum. The movement of the stage is connected to a support controlled by a controller (8), a portion of which is located outside or external to the chamber in the space indicated by (2) which is filled by the atmosphere. The controller (8) can be manipulated from the outside (2) to move the apparatus within the chamber even when in vacuum (1).

When using the device between characterizing the photon beam and using the photon beam for its intended purpose, there is no need to break the vacuum or dissemble the vacuum chamber or light source assembly containing the stage or in-vacuum assembly. Further, when using the device, there is no need to disturb or alter the alignment of the photon beam between characterizing the photon beam and using the photon beam for its intended purpose.

The device has two or three of the following operating modes. Each operating mode corresponds to three different positions of the stage (see FIG. 1): out-of-beam (Panel A), spectrometer (Panel B), and beam-profiler (Panel C). In some embodiments, the device has an out-of-beam modes and a spectrometer mode.

In the out-of-beam mode (FIG. 1, Panel A), the stage is positioned such that the photon beam (9) is not blocked or contacted by the apparatus.

Figure 5:
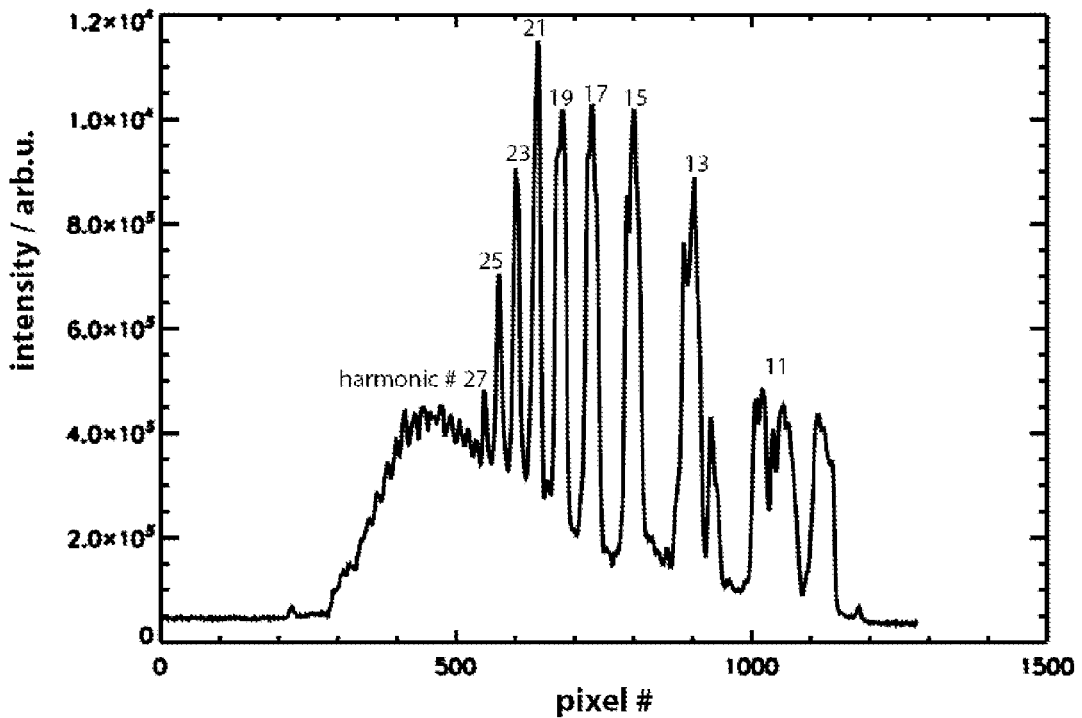
FIG. 5 shows a graph indicating the profile of a diffracted beam measured using a device of the present invention in the mode indicated in FIG. 1, Panel B.

In the spectrometer mode (FIG. 1, Panel B), the photon beam (9) diffracts from the transmission grating (3) to produce a diffracted photon output (10) which in turn contacts the image detector (4) which converts the diffracted photon output into a visible image. The visible image is reflected off the reflective surface (5) and is projected (11) to the image recorder (7). A diffraction pattern of the photon beam is measured in this mode. An example of such a pattern is shown in FIG. 5.

Figure 3:
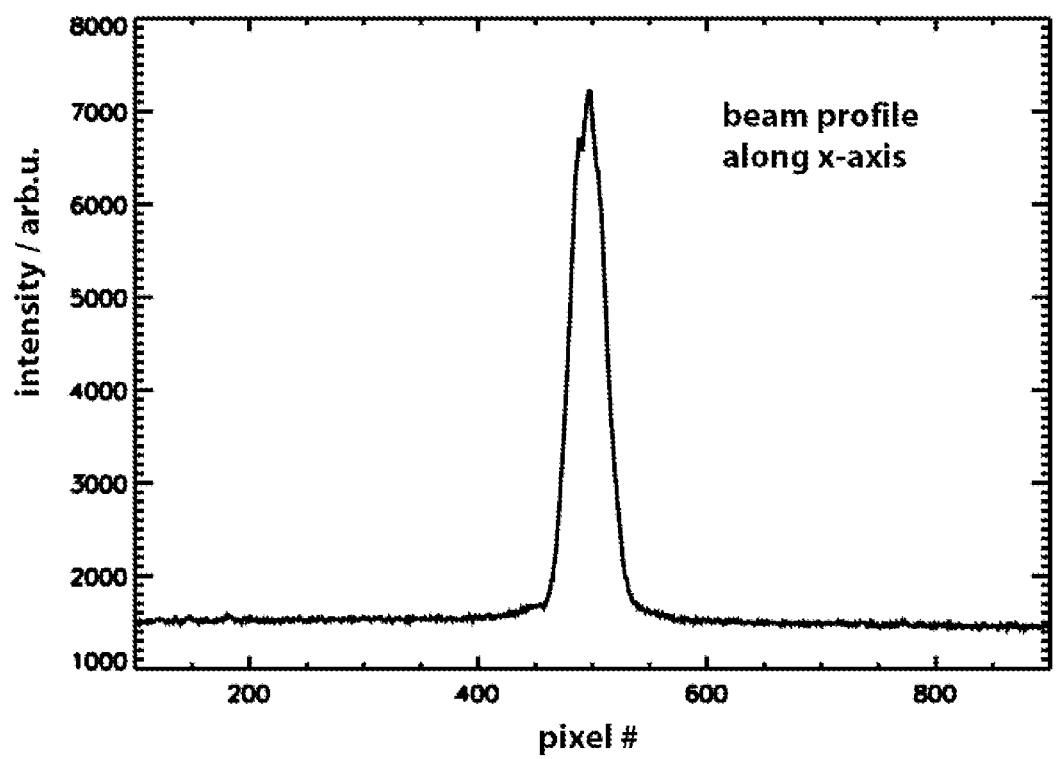
FIG. 3 shows a graph indicating a beam profile along the x-axis (or horizontal axis) measured using a device of the present invention in the mode indicated in FIG. 1, Panel C.
Figure 4:
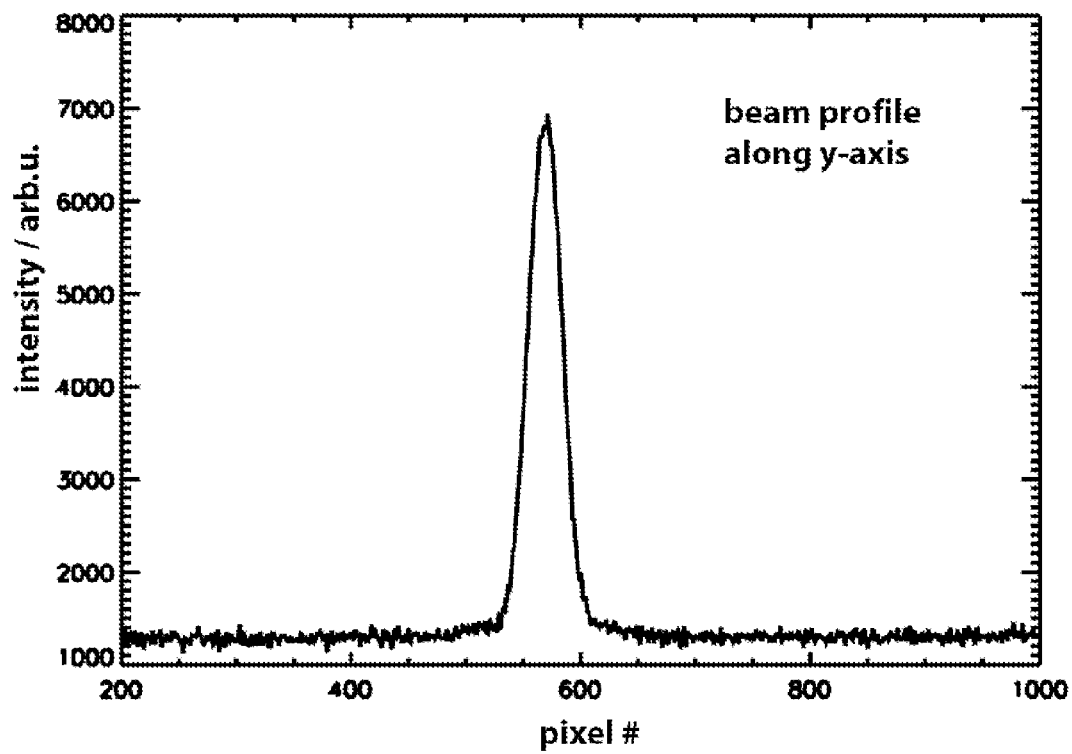
FIG. 4 shows a graph indicating a beam profile along the y-axis (or vertical axis) measured using a device of the present invention in the mode indicated in FIG. 1, Panel C.

In the beam-profiler mode (FIG. 1, Panel C), the photon beam (9) directly contacts the image detector (4) and the resultant image is reflected off the reflective surface (5) and is projected (12) to the image recorder (7). A spatial intensity profile of the photon beam is measured in this mode. An example of such a pattern is shown in FIGS. 3 and 4.

In one embodiment of the invention, the device has three operating modes corresponding to three different positions of the translation stage: out-of-beam, spectrometer, beam-profiler. In the out-of-beam mode, the breadboard is the closest to the 10" Conflat® flange and the photon beam can pass by the assembly without being disturbed. In the spectrometer mode, the photon beam passes through the slit aperture and diffracts from the transmission grating. The MCP/phosphor screen imaging detector converts the VUV photon diffraction pattern into a visible image on the back of the phosphor screen. This image is projected onto the CCD camera by the flat mirror and the zoom lens. In the beam-profiler mode, the photon beam either passes through an attenuator (such as an aluminum foil) or directly hits the front face of the MCP/phosphor screen imaging detector. The VUV photon beam spatial intensity profile is converted into a visible image on the back of the phosphor screen. The visible image is projected onto the CCD camera by the flat mirror and the zoom lens. The speed of the Picomotor™ motion defines the length of time it takes to switch between different modes. Switching between the out-of-beam and spectrometer modes takes about seven minutes. Switching between the spectrometer and beam-profiler modes also takes about seven minutes. Accordingly, it takes about fourteen minutes to switch between the out-of-beam and beam-profiler modes.

The Advantages of Using the Device

The spectrometer enables the almost simultaneous determination of two of the most important characteristics of any VUV photon beam: the spectrum and the spatial mode. The characterization can be performed in situ and without disturbing any optical components since the spectrometer can be completely removed from the beam path. The ultra-compact and self-contained design of the spectrometer allows for an easy implementation into existing systems. All that is needed is a 10" Conflat® port at some point along the beam path. It truly is a "plug-and-play" system. The assembly of the spectrometer and the alignment of all critical components is straight forward and performed at atmosphere before the spectrometer is mounted to the vacuum system. Once the operating pressure is reached, operation is achieved immediately. No further fine adjustment is necessary except for the course positioning which defines the different operating modes. The device eliminates problems of alignment deterioration during pump-down as all of the critically aligned components are always exposed to the same pressure. A system as shown in FIG. 2 has been demonstrated to be vacuum compatible with pressures of $10^{-7}$ mbar. Only minor design changes to this system would be required to reach $\sim 10^{-9}$ mbar and lower pressures. Thus, the device can be implemented in any accelerator-based or laser-based VUV beam source. Furthermore, the simple design of the device permits the addition of further functions without the need to alter the basic operating principle. For example a slightly longer range of the translation stage and actuator allow the addition of more components onto the breadboard for further beam characterization. A photodiode for absolute photon flux measurements can be mounted. Variations such as different types of MCPs with different coatings, different grating-MCP distances and larger MCP/phosphor screen detectors can improve the sensitivity and resolution of the spectrometer in various photon energy ranges. The high sensitivity of the MCP-based imaging detector allows for applications with extremely low photon fluxes, for example in the early development and/or commissioning stages of new light sources. Higher photon fluxes can be characterized by using beam attenuators (e.g. thin foils) mounted to the beam-entry area of the breadboard.

The spectrometer allows for a range of measurements to be performed within a short time, in-situ, without disturbing the beam optics, with minimum installation effort and at very low total costs.

Detection of the VUV photons can be achieved using a commercial MCP/phosphor screen detector. The detector can be mounted to a home-built compact stand which also guides and stress-relieves the detector high-voltage cables during the translational motion of the setup. The projection of the phosphor screen image onto an atmosphere-side mounted camera using a mirror dramatically simplifies the design as compared to systems based on vacuum-compatible cameras or fiber-optic image-transmission. The parallel orientation of the translational motion and the image projection axis enable a convenient operating mode switch.

The device is useful for characterizing VUV/soft x-ray beamlines. The light is generated in a high-order harmonic generation process, converting ultrashort, ~800 nm, 25 fs pulses to ultrashort pulses in the VUV- and soft x-ray-regime.

The present invention would be useful for profiling/characterizing high-order harmonic generation light sources (such as chemical dynamics, AMO sciences, attosecond science, and ultrafast microscopy). The present invention would also be useful for profiling/characterizing fourth generation light sources.

The invention having been described, the following examples are offered to illustrate the subject invention by way of illustration, not by way of limitation.

EXAMPLE 1

An ultracompact, high-sensitivity spectrometer and beam profiler for in-situ VUV beam characterization has been designed and constructed as part of a High-order Harmonic Generation project. A single 10" Conflat flange supports the entire assembly, including the in-vacuum assembly, which can be inserted into the beamline and operated in a "plug-and-play" fashion. FIG. 2 show the entire assembly. FIGS. 3 and 4 show the beam profiles recorded using a beamline. High-order harmonics were generated in a gas cell filled with argon. The solid lines in FIG. 5 are a theoretical description of a diffraction pattern generated by the 2-D transmission grating.

EXAMPLE 2

A compact, versatile device for vacuum ultraviolet (VUV) beam characterization is presented. It combines the functionalities of a VUV spectrometer and a VUV beam profiler in one unit and is entirely supported by a standard DN200 CF flange. The spectrometer employs a silicon nitride transmission nanograting in combination with a microchannel plate-based imaging detector. This enables the simultaneous recording of wavelengths ranging from 10 to 80 nm with a resolution of 0.25-0.13 nm. Spatial beam profiles with diameters up to 10 mm are imaged with 0.1 mm resolution. The setup is equipped with an in-vacuum translation stage that allows for in situ switching between the spectrometer and beam profiler modes and for moving the setup out of the beam. The simple, robust design of the device is well suited for nonintrusive routine characterization of emerging laboratory- and accelerator-based VUV light sources. Operation of the device is demonstrated by characterizing the output of a femtosecond high-order harmonic generation light source.

1 Introduction

Novel VUV light sources are the tools of the trade of a fast growing scientific community that extends the field of ultrafast real-time studies into photon energy regimes beyond the realm of conventional femtosecond lasers. In particular laboratory-scale setups that employ the technique of high-order harmonic generation (HHG) driven by an intense infrared (IR) femtosecond laser allow for a new class of time-domain experiments using moderately intense femtosecond and even attosecond duration VUV light pulses. Prominent examples for this emerging field of ultrafast science are the direct determination of an atomic inner-shell hole lifetime, the real-time monitoring of unimolecular dissociation dynamics, the observation of delayed photoemission from solids, the quantum state-resolved probing of aligned electron holes created by strong-field ionization and the real-time observation of electron tunneling.

Despite the widespread application of HHG based VUV light sources in fundamental research, to the best of our knowledge no design has been reported for a compact, nonintrusive tool for in-situ characterization of two of the most important characteristics of a VUV light beam, the photon energy spectrum and the spatial beam profile. This is in stark contrast to the established field of ultrafast research in the IR/visible regime, which heavily relies on in-situ beam characterization using commercially available spectrometers and beam profilers. VUV spectrometers are of course ubiquitous in many research laboratories and designs have been reported that are specifically tailored toward the detection of HH's. In general, however, these spectrometers are designed and built to become a stationary part of the experiment, i.e. the recorded spectrum is the experimental result. This often leads to a layout that makes it difficult to use the spectrometer as a fast diagnostic for a VUV light beam that is used for different experiments, such as photoelectron or ion spectroscopy. Owing to the small ratio between the short wavelengths of VUV radiation and standard grating constants, the size of a VUV spectrometer is usually on the scale of ≈1 m, contributing a significant fraction to the overall laboratory footprint of the experiment. Mobile optics that permit to route the VUV beam either into the experiment or the spectrometer are often incompatible with the requirement for interferometric stability in experiments such as attosecond time-resolved spectroscopy.

Here, we present a highly sensitive VUV beam analyzer that combines the functionalities of a spectrometer and a beam profiler in a single compact unit that can readily be implemented in most experimental setups. It employs a transmission nanograting in combination with a microchannel plate (MCP) based imaging detector. The entire unit is mounted on a standard DN200 CF vacuum flange; the in-vacuum dimensions are less than 200 mm×200 mm×100 mm (length×width×height). Wavelengths ranging from 10 nm to 80 nm are recorded simultaneously with a resolution that varies from 0.25 nm to 0.13 nm across the spectral range. Beam profiles with diameters up to 10 mm are imaged with 0.1 mm resolution. The sensitivity of the device is adjustable, the upper limit reaching the single photon counting regime. The large dynamic range in combination with a low background noise enables the characterization of a large variety of VUV light sources. All in-vacuum components are mounted on a remote-controlled translation stage. Switching between the operating modes of the beam analyzer as well as the removal of the unit from the VUV beam path is completed within minutes. The design removes any impact of the beam analysis on the alignment of experimental components and effectively de-couples the precision of the stage motion from the spectrometer resolution.

The functionality of the VUV spectrometer and beam profiler is demonstrated by characterizing the output of a HHG light source that is based on a loosely focused IR driving pulse and a differentially pumped gas cell. An elliptical VUV beam profile is observed. Numerical simulations of coherent beam propagation show that it is the result of a commonly used astigmatic driver focusing geometry. Adjusting the temporal chirp of the driving IR laser leads to significant changes in the HH spectrum including splitting of HH peaks. The spectral structures may be due to interference effects in the single atom response to chirped driver pulses as recently described by Liu and co-workers (C. D. Liu et al., Opt. Express 17, 10319 (2009)).

2 Design

Figure 6:
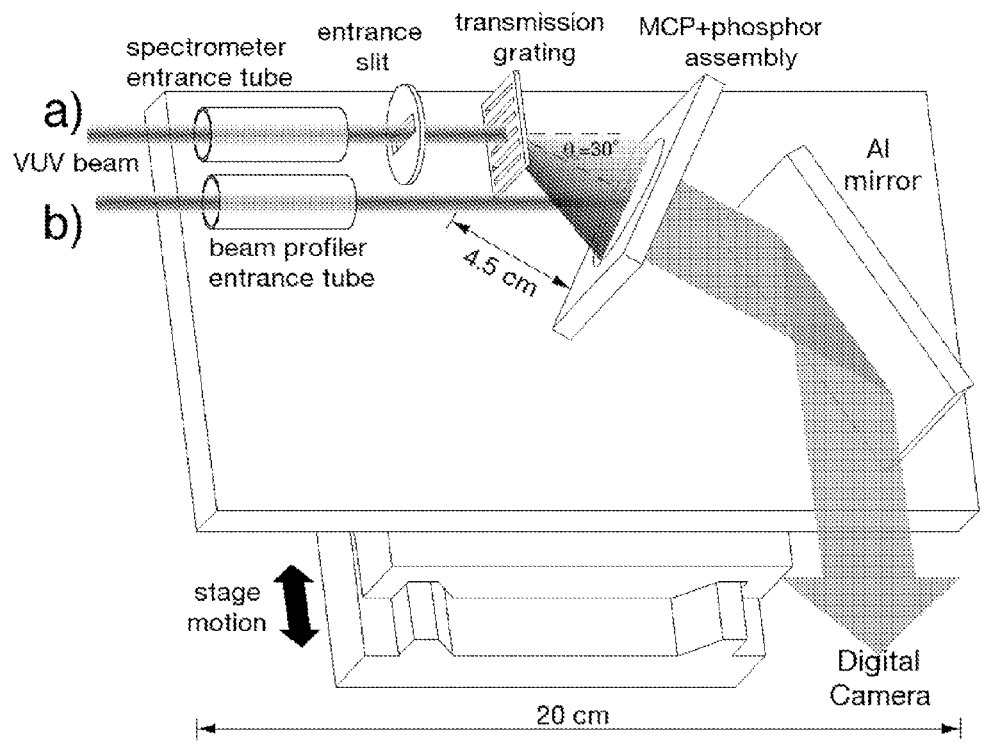
FIG. 6 shows a device of the present invention: In spectrometer mode (a), the VUV beam passes through the entrance tube, the 50 μm wide entrance slit and is dispersed by the transmission grating. The diffraction pattern is detected by the MCP-phosphor screen assembly and imaged onto a digital camera through a DN63 viewport by means of an Al mirror. In beam profiler mode (b), the VUV beam passes through an entrance tube and is directly incident on the MCP detector. The direction of motion of the translation stage is indicated by the double arrow.

A photograph of the device is shown in FIG. 2, the main components are sketched in FIG. 6. All elements of the spectrometer and beam profiler except for the digital camera are mounted on a standard optical breadboard. The breadboard is attached to a linear translation stage with 50 mm maximum travel distance (Newport 436). For increased vacuum compatibility, the stage is disassembled, anodized surface layers are removed and the crossed roller bearing lubricant is replaced by a vacuum-compatible grease (Apiezon L). The entire setup is mounted on a standard DN200 CF vacuum flange, facilitating quick integration of the device into existing experimental setups. The stage position is controlled by a high vacuum compatible piezo-actuator (Newport Picomotor 8303-V) that facilitates remote in-vacuum switching between spectrometer (FIG. 6, position (a)) and beam profiler (FIG. 6, position (b)) modes and clearing the VUV beam axis by ~10 mm for experiments that require light downstream from the spectrometer. In spectrometer and beam profiler modes, the VUV beam enters the setup through 30 mm long tubes with 10 mm inner diameter in order to limit the amount of background light in the system.

In spectrometer mode, the beam passes through the 50 μm wide entrance slit and is incident on the transmission nanograting at an angle of 0 (normal to the grating plane). The SiN transmission grating (nm LLC) used in this setup was developed by T. Savas and H. Smith (T. A. Savas, S. N. Shah, M. L. Schattenburg, J. M. Carter, and H. I. Smith, J. Vac. Sci. Technol. B 13, 2732 (1995); T. A. Savas, M. L. Schattenburg, J. M. Carter, and H. I. Smith, J. Vac. Sci. Technol. B 14, 4167 (1996)). The grating is composed of free-standing 44 nm wide bars with a 100 nm periodicity, leaving 56 nm wide spaces between the bars. The bars are developed from a 200 nm thick SiN membrane by achromatic lithography. For improved mechanical stability of the grating, the vertical bars are intercepted by horizontal support structures spaced by approximately 1.5 μm. The small period of the grating facilitates a compact spectrometer design with a resolution of 0.25 nm to 0.13 nm at wavelengths of 10 nm and 80 nm respectively.

In beam profiler mode, the VUV beam is incident on the imaging detector at angles of 30 horizontally and 0 vertically. To correct for the effect of this geometry on the beam profile, the detector image is scaled horizontally by a factor during the analysis.

The imaging detector (Beam Imaging Solutions) consists of two resistance-matched imaging quality MCPs (Burle Photonis) in Chevron configuration combined with an aluminized P-20 phosphor screen. The active area of the round detector is 40 mm in diameter. The detector is attached to the optical breadboard with a home-built mount equipped with a polytetrafluoroethylene (PTFE)-lined cable clamp to minimize stress on the high-voltage contacts during motion. In order to minimize variations of detection efficiency across the imaging detector in the dispersive plane due to differences in photon incidence angles, the MCP stack is aligned such that the channels are tilted in the vertical plane only. Uncoated, rimless 1.5 mm thick MCPs with 25 μm nominal pore size and 8 bias angle convert incident photons into electron bunches that are accelerated onto the phosphor screen.

The front of the MCP assembly is mounted at a distance of L=45 mm from the center of the diffraction grating. The detector surface normal is tilted relative to the VUV beam propagation direction by $\theta_0=30°$ (FIG. 6). The fluorescence of the phosphor screen is imaged through a DN63 CF vacuum viewport onto a zoom-lens equipped digital camera by means of an enhanced Al utility mirror (Newport). In the present setup, the 1280×1024 pixels CMOS camera (Edmund Optics) is used in integration mode. The zoom-lens is adjusted to image a 44 mm wide area onto the camera corresponding to a pixel limited resolution of 35 μm. With single-shot detection and centroiding analysis, the uncertainty due to electron bunch size can be reduced down to the MCP pore size of approximately 25 μm.

Figure 7:
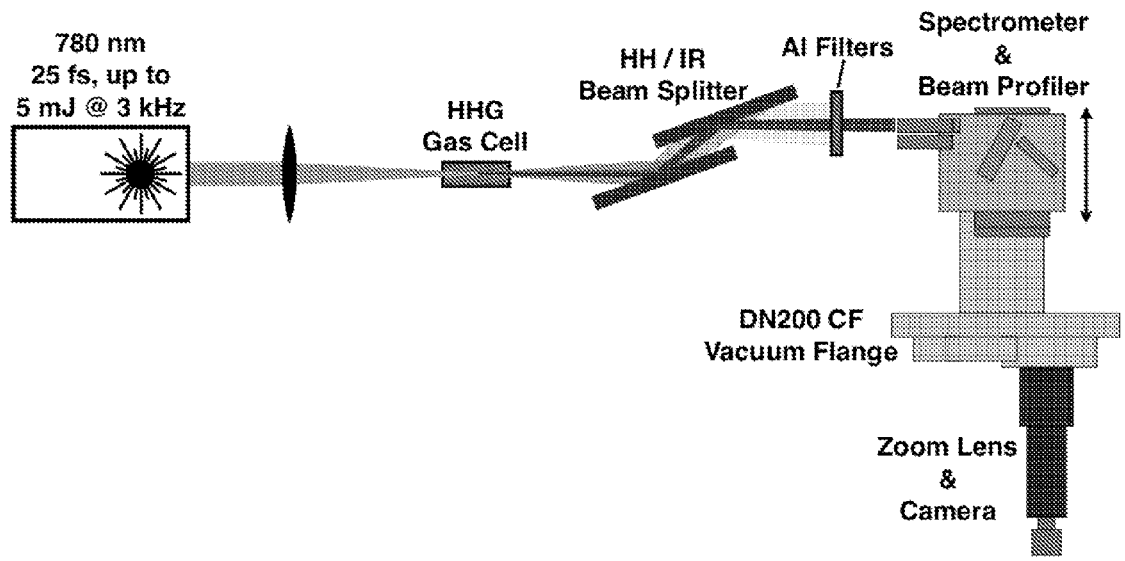
FIG. 7 shows an experimental setup for high-order harmonic generation and analysis.

Performance of the spectrometer and beam profiler is demonstrated by characterizing a VUV beam produced by high-order harmonic generation (HHG) in Ar and Kr (FIG. 7). An intense femtosecond infrared (IR) laser beam is generated by routing the output of a mode-locked Ti:sapphire laser through a cryogenically cooled two-stage amplifier system (Red Dragon, KM Laboratories). The IR beam with a diameter of 20 mm is focused by a concave mirror with 2 m nominal focal length into a target cell filled with noble gases at pressures of several mbar. The cell is terminated by 50 μm thick Ni foils on both ends. The IR beam drills a path through these foils within a fraction of a second. A high throughput turbomolecular pump (Shimadzu TMP 3203LM) maintains a pressure difference of about 6 orders of magnitude between the gas cell and the surrounding vacuum chamber. The strong IR field (up to $10^{15}$ W/cm) ionizes the target gas. Field-driven electron-ion recollision and recombination leads to emission of radiation at frequencies equal to odd integer multiples of the fundamental laser frequency. The maximum achievable photon energy depends on the maximum peak power of the focused laser pulse and the ionization potential of the gas. HH light emerges from the cell collinearly with the driver laser beam and is separated from the co-propagating IR by two reflections from superpolished pure silicon mirrors under Brewster angle geometry for the IR beam, and subsequent passage through an aluminum filter. To avoid detector saturation, a set of aluminum filters of various thicknesses (100 nm-7 μm) are mounted on an in-vacuum manipulator that is separate from the spectrometer assembly.

3 Diffraction from a Transmission Nanograting

The compact design of the spectrometer voids the application of small angle approximations and leads to geometry-induced variations of the spectral sensitivity. In the following, equations are derived that are needed to extract relative spectral intensities from the experimental images. In addition, they are used for the precise determination of the detector position with respect to the diffraction grating, as described in the next section.

Figure 8:
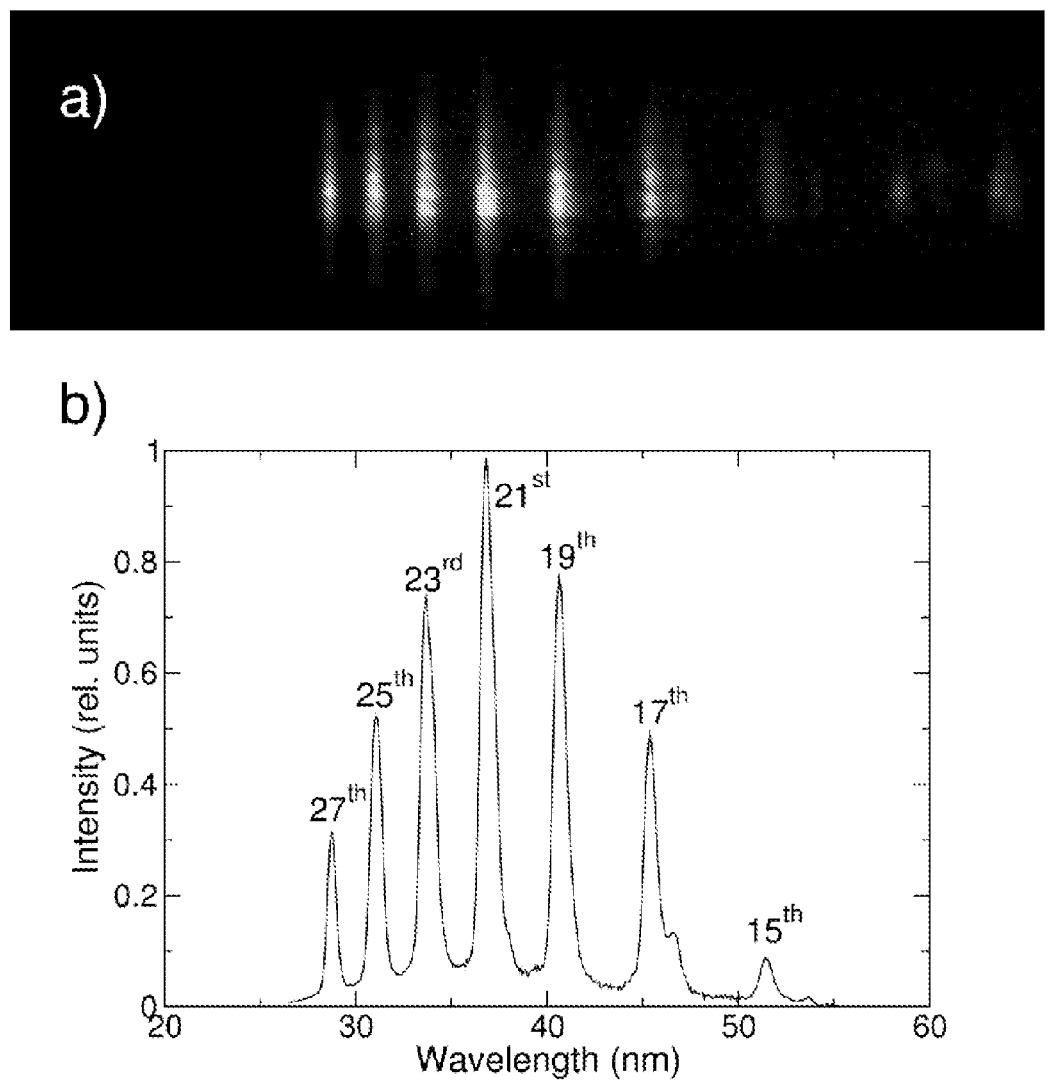
FIG. 8 shows: (a) Image of the diffraction pattern of a femtosecond VUV light beam recorded using a 4 μm thick aluminum filter. (b) Spectrum extracted from (a) by analysis of the 2D diffraction pattern as described herein.

For a normal incidence geometry, the diffraction angle θ for the nth diffraction order is given by:

$$\sin\theta = n\frac{\lambda}{d}, \tag{1}$$

where λ is the wavelength of the incident light and d=100 nm is the period of the grating. A typical diffraction pattern is shown in FIG. 8a. It is recorded using a 4 μm thick Al filter and an image integration time of 30 s. Potential differences of 1450 V across the MCP stack and 2350 V between the stack and the phosphor screen are applied. The VUV beam is generated using 25 fs duration IR driving pulses (785 nm) with 3.6 mJ pulse energy. The HHG gas cell is filled with Ar at a stagnation pressure of 5.3 mbar. The vertical lines in the image correspond to the signal from individual harmonics separated by 3.2 eV (twice the 1.6 eV photon energy of the IR driving laser).

The individual harmonic traces seen in FIG. 8a are vertically elongated. Their detailed structure is better resolved in FIG. 9a, which is recorded using a 100 nm thick Al filter. The central part of the image is strongly saturated, the upper and lower parts display a series of vertically displaced maxima for each harmonic with a characteristic crescent shape. This pattern is caused by diffraction of the VUV light on the periodic support structure of the grating as discussed by Wilhein and co-workers (T. Wilhein et al., Rev. Sci. Instr. 70, 1694 (1999)). The period of the support structure is about 1.5 μm and thus the first order diffraction angle at a wavelength of 50 nm is 1.9 corresponding to a vertical displacement of approximately 1.5 mm on the detector screen.

Figure 10:
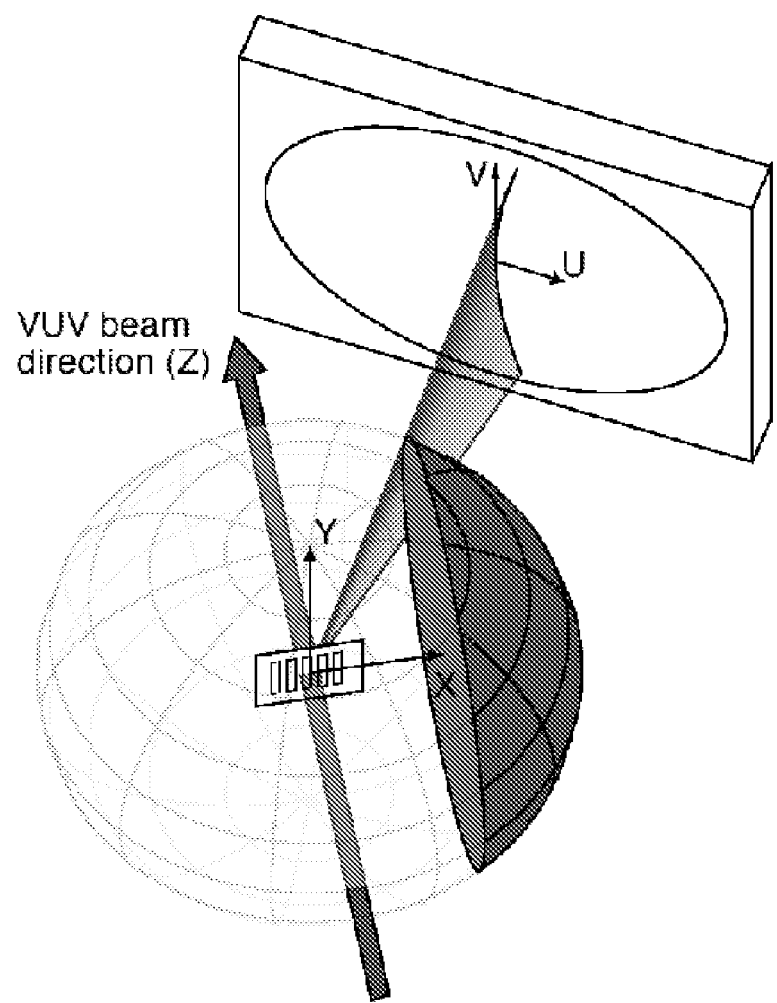
FIG. 10 shows the geometry of the VUV beam diffraction.

To understand the crescent shape of the diffraction patterns of individual harmonics, it is necessary to consider diffraction in two dimensions (FIG. 10). Let $\vec{k}$ be the wave vector of the diffracted light and $k_x$, $k_y$, $k_z$ its components along the three cartesian axes: the z axis is pointing along the beam direction, they axis is pointing vertically along the grating bars and the x axis is pointing horizontally to the right when looking along the z axis. Due to energy conservation, the length of the wave vector remains unchanged upon diffraction. Diffraction in two dimensions can be described by a change in the wavevector direction in the horizontal and vertical planes equal to integer multiples of the reciprocal periods of the grating and the support structure:

$$\Delta\vec{k} = n_x \vec{e_x}\frac{2\pi}{d_x} + n_y \vec{e_y}\frac{2\pi}{d_y}. \tag{2}$$

Here, $\vec{e_x}$ and $\vec{e_y}$ are the unit vectors in the corresponding directions, $n_x$ and $n_y$ are the diffraction orders, $d_x$ and $d_y$ and are the periods of the grating and the support structure, respectively. For gratings with open aperture ratios close to 50%, second order diffraction maxima are strongly suppressed. Therefore, only the case of $n_x=1$ will be discussed in the following. It is straightforward to generalize the results to higher diffraction orders.

By definition, the components of the incident wavevector along the x and y axis are equal to zero and thus the diffracted beam components are equal to the corresponding projections of $\Delta \vec{k}$. The third component is determined by energy conservation:

$$k_z^2 = k^2 - k_x^2 - k_y^2. \quad (3)$$

The diffraction angle in the horizontal plane is given by the ratio of the two wavevector projections:

$$\tan(\theta_x) = \frac{k_x}{k_z}. \quad (4)$$

In the case of additional vertical diffraction, increasing values of $k_y$ lead to a decrease of $k_z$ according to Eq. (3) and thus to larger values of the horizontal diffraction angle $\theta_x$ in Eq. (4). As shown in FIG. 10, the resulting curvature of the first order diffraction maximum of a single harmonic is given by the curvature of a section of a sphere of radius k. The two-dimensional diffraction patterns can be calculated by intersecting the directions of the diffraction maxima with the detector plane positioned at a distance L from the center of the grating with the angle $\theta_0$ between the surface normal and the VUV beam direction:

$$x = \frac{L k_x}{k_x \sin\theta_0 + k_z \cos\theta_0}, \quad (5)$$
$$y = \frac{k_y}{k_x} x.$$

To analyze the spectra recorded by the camera, it is more convenient to transform these equations into a coordinate system in the detector plane. Let u be the horizontal coordinate of the image recorded by the camera and v be the vertical coordinate (FIG. 10). The origin of the u,v coordinate system is the normal projection of the grating center on the detector plane. Since the back of the detector is imaged onto the camera by a mirror, the direction of u in the camera image is the same as in the detector plane, it points toward increasing diffraction angles.

$$u = (x - L \sin\theta_0)/\cos\theta_0,$$
$$v = y. \quad (6)$$

For diffraction in the horizontal plane (y=v=0), the wavelength of the detected radiation can be expressed as a function of the pixel position u in screen coordinates:

$$\lambda = d \sin\left[ a\tan\left(\frac{u - u_0}{A}\right) + \theta_0 \right]. \quad (7)$$

Here, $u_0$ is the position of the origin of the u,v coordinate system, $\theta_0 = 30°$ is the angle between the detector plane normal and the VUV beam direction, d=100 nm is the period of the grating and the constant A depends on the magnification of the imaging system and the distance between the grating and the detector plane (L=45 mm).

Figure 9:
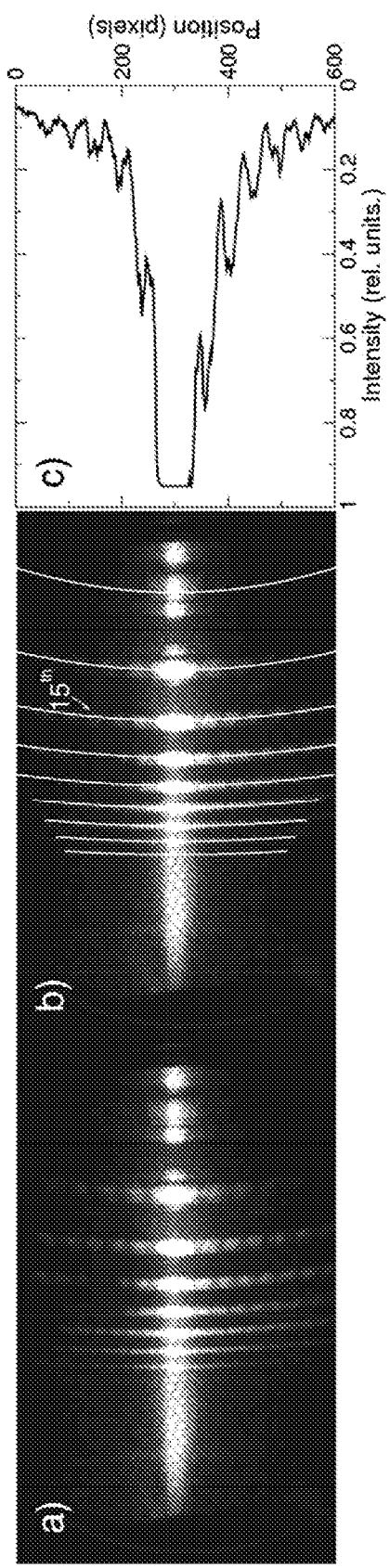
FIG. 9 shows: (a) Diffraction image of the HHG beam generated using laser parameters similar to FIG. 8 and recorded using a 100 nm thick aluminum filter. In the central region the spectrum is saturated. (b) The same image as in (a) with superimposed vertical diffraction lines calculated using the method described in the text. (c) Vertical diffraction pattern of the 15 harmonic extracted from (b).

Equations (2)-(6) are employed to derive the VUV spectrum from the two-dimensional detector image. They are also used to calibrate the detector angle $\theta_0$ and the distance L between the MCP and the grating by analyzing a spectrum containing two or more known wavelengths. This calibration is usually more precise than the determination of $\theta_0$ and L with standard measuring techniques since mechanical precision tools such as calipers and angle protractors are hard to use without damaging the fragile components. The supplementary material for this study is publicly available on the webpage: "http://rsi.aip.org/rsinak/v81/i6/p063109_s1". It contains computer programs, written for GNU Octave scientific package, that can be used for parameter calibration and generation of VUV spectra as described above. The crescent diffraction patterns are shown in FIG. 9b by white lines. Integration of the image in FIG. 8a along these crescent lines results in the spectrum shown in FIG. 8b.

The analysis of the diffraction pattern described above is used to estimate the spectrometer resolution. The width of the entrance slit of 50 µm contributes a wavelength uncertainty of approximately 0.08 nm at a wavelength of 50 nm. The resolution is further affected by the spot size of the electron bunch of about 70 µm generated by the MCP assembly and by the resolution of the digital camera used for imaging. The combined wavelength uncertainty is estimated to be $\Delta\lambda = 0.24$ nm ($\Delta E = 120$ meV) at a wavelength of $\lambda = 50$ nm (24.8 eV) corresponding to a resolving power of $\lambda/\Delta\lambda \approx 210$. The spectral resolution varies across the detector from $\Delta\lambda = 0.13$ nm ($\Delta E = 12$ meV) at the low-energy side ($\lambda = 80$ nm, E=15.5 eV) to $\Delta\lambda = 0.25$ nm ($\Delta E = 1.6$ eV) at the high-energy side ($\lambda = 10$ nm, E=124 eV).

4 Intensity Calibration

To extract relative intensities from the recorded spectra, it is necessary to account for three factors that introduce a wavelength dependence in the spectrometer detection efficiency: i) the wavelength dependence of the MCP quantum detection efficiency (QDE), ii) the angular dependence of the QDE, and iii) the diffraction efficiency of the transmission grating.

Figure 11:
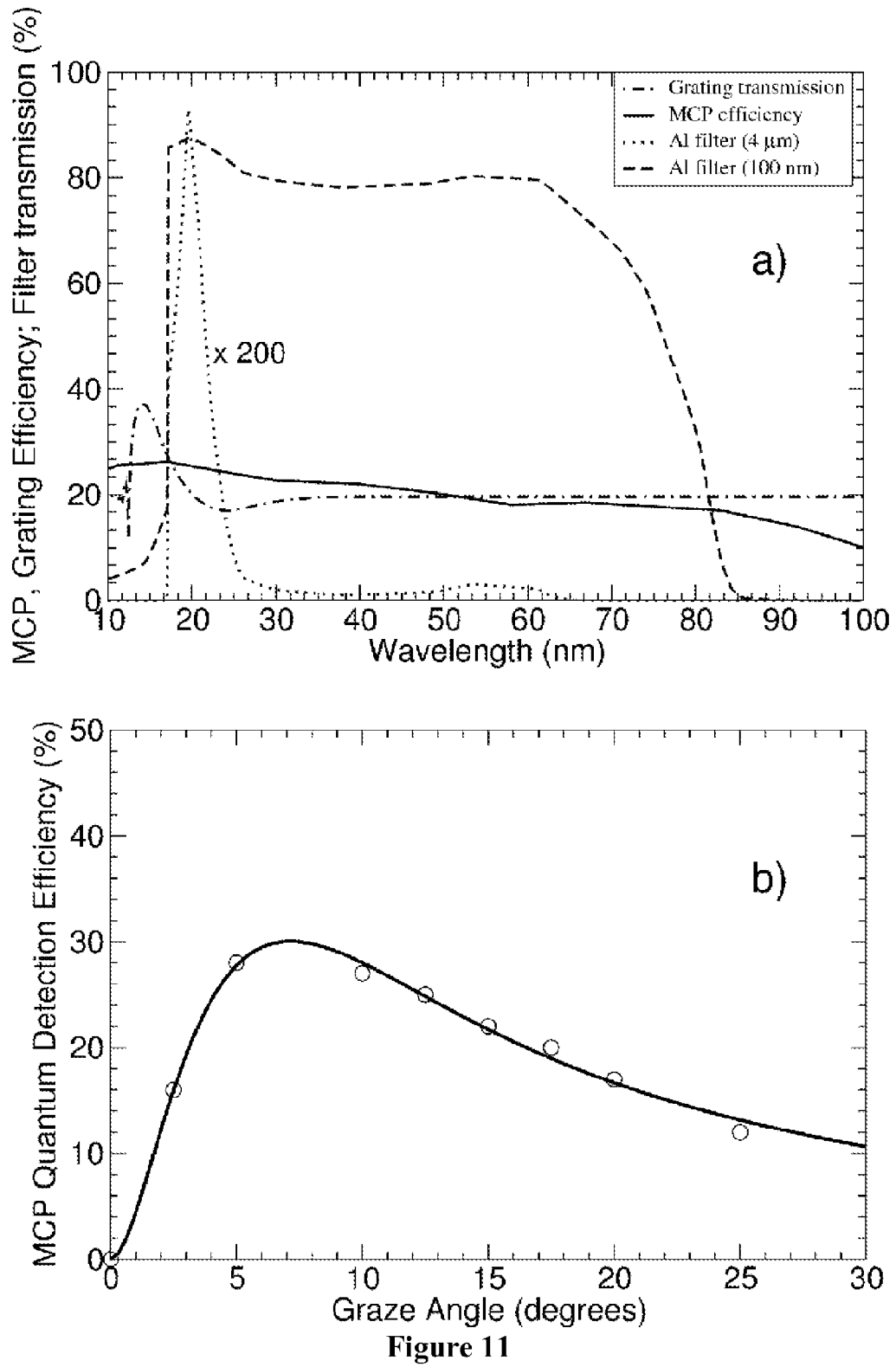
FIG. 11 shows: (a) wavelength dependence of the grating diffraction efficiency in the first order (dash-dotted line) (B. L. Henke, E. M. Gullikson, and J. C. Davis, Atom. Data Nucl. Data Tables 54, 181 (1993)), MCP quantum detection efficiency (solid line) (O. Siegmund, J. Vallerga, and A. Tremsin, Proc. SPIE 5898, 58980H (2005)), and transmission functions of a 100 nm (dashed line) and a 4 μm (dotted line, multiplied by 200) thick aluminum filter (B. L. Henke, E. M. Gullikson, and J. C. Davis, Atom. Data Nucl. Data Tables 54, 181 (1993)). (b) Angular dependence of the MCP quantum detection efficiency. The experimental data (open circles) are taken from O. Siegmund, J. Vallerga, and A. Tremsin, Proc. SPIE 5898, 58980H (2005), the solid line is the result of a least square fit using the empirical Eq. (8).

The wavelength and angular dependence of MCP quantum detection efficiencies have been studied both experimentally and theoretically. For MCPs similar to those used in our imaging system, both angular and wavelength dependences of the QDEs are given by Siegmund and co-workers (O. Siegmund, J. Vallerga, and A. Tremsin, Proc. SPIE Int. Soc. Opt. Eng. 5898, 58980H (2005)). The wavelength dependence from FIG. 2 of Siegmund et al. is plotted in FIG. 11a as a solid line. The measured QDE angular dependence from FIG. 3 of Siegmund et al. covers a range of graze angles $\phi = 0°$-$25°$. The angular dependence of the QDE at larger graze angles is proportional to $\cot(\phi)$. An empirical fit function with this asymptotic dependence is used to calculate the QDE angular dependence $Q(\phi)$ across the entire range of incidence angles $\phi = 0°$-$40°$ of the spectrometer setup:

$$Q(\phi) = Q_6 (1 - e^{-\phi/\phi_n})^3 \cot(\phi), \quad (8)$$

where $\phi$ is the graze angle between the incident beam and the MCP pore axis. The constants and are determined by a least square fit. The experimental data of Siegmund et al. together with a fit according to Eq. (8) are plotted in FIG. 11b. Using Eqs. (2)-(6) and the efficiency data from FIG. 11, a two-dimensional calibration matrix is derived that assigns a total detection efficiency to every point on the detector. The calculation takes into account that the pores of the micro-channel plates are tilted vertically at an angle of 8°.

The detector images are integrated along the diffraction pattern in the vertical dimension after correcting for angular and wavelength dependence of the QDE. Apart from these corrections it is only necessary to account for the first order diffraction efficiency in the horizontal dimension. This efficiency is calculated using the "X-ray interaction with matter" calculator of the Center for X-ray Optics (CXRO) at Lawrence Berkeley National Laboratory (B. L. Henke, E. M.

Gullikson, and J. C. Davis, Atom. Data Nucl. Data Tables 54, 181 (1993)). The grating efficiency curve is plotted in FIG. 11a as a dash-dotted line.

By normalizing the measured spectrum using the Al filter transmission curve, the spectrum of the HHG source upstream from the filter is derived. The filter transmission curves are calculated using the "X-ray interaction with matter" calculator of the Center for X-ray Optics. The transmission curves for the 100 nm and 4 µm thick Al filters are shown in FIG. 11a as dashed and dotted lines, respectively.

5 Characterization of a HHG Based Femtosecond VUV Light Source

Figure 12:
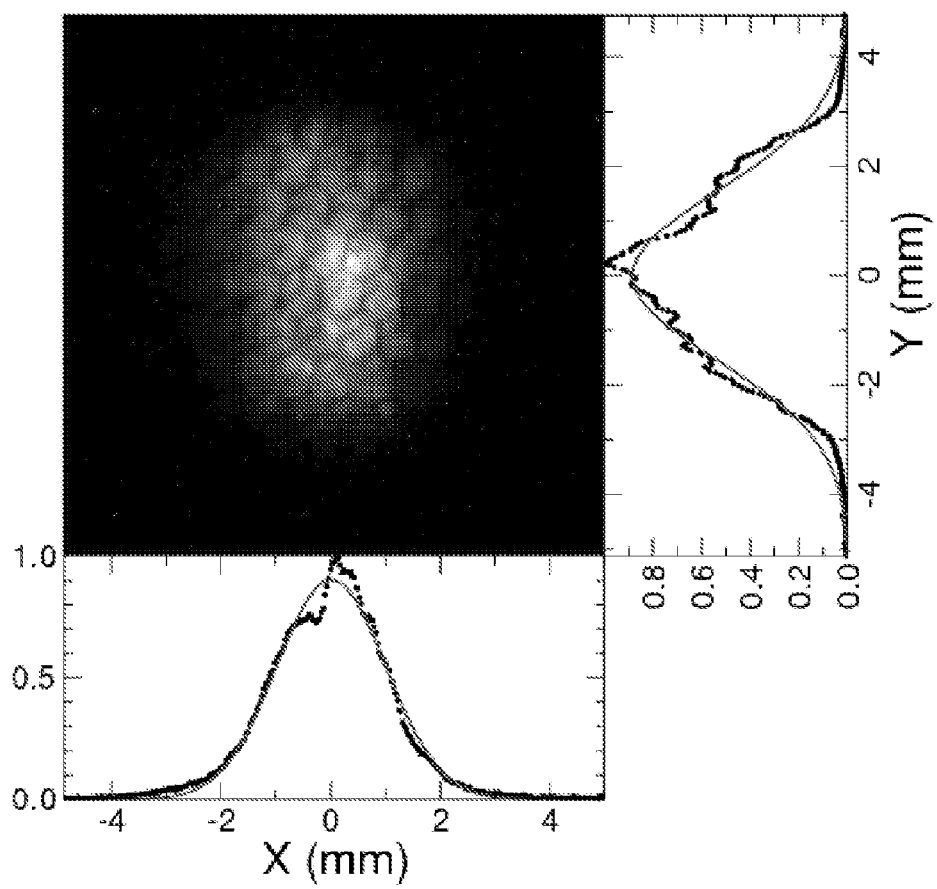
FIG. 12 shows the spatial profile of the HH beam generated at conditions similar to the ones in FIG. 8. The hexagonal shapes are due to the MCP channel packing structure. The profiles in the side and bottom panels are derived by integrating the image along the X and Y axis, respectively. Fits to Gaussian functions (solid lines) are used to derive the beam dimensions (FWHM) of 2.5 mm×4.0 mm (X×Y)

The performance of the spectrometer and beam profiler is demonstrated by probing the spatial beam profile of a HHG based VUV light source and the dependence of the VUV spectrum on the temporal chirp of the IR driver pulse. A typical VUV beam profile is shown in FIG. 12. The honeycomb structure in the image is a result of the MCP channel packing geometry. The beam profile has an elliptical, vertically elongated shape. The side panels in FIG. 12 show the intensity distributions along the vertical and horizontal axes, derived by integrating the two-dimensional beam profile along the horizontal and vertical axis, respectively. Fits to Gaussian distribution functions (smooth solid lines) lead to beam full-widths-at-half-maximum (FWHM) of 4.0 mm (vertically) and 2.5 mm (horizontally). The beam analyzer is positioned 2.40 m away from the HHG source. Correspondingly, the far-field divergence angle $\Theta_{HH}$ is on the order of $\Theta_{HH}$=1-2 mrad. The IR beam focusing geometry corresponds to a far-field divergence of $\theta_{IR}$=10 mrad. A Gaussian beam description requires the beam divergence for a fixed beam waist to scale exactly with the wavelength, corresponding to a divergence ratio of 15 to 27 between the fundamental IR driving beam and the 15 to 27 harmonic. However, the beam waist for HH is smaller than for the IR driver since only the regions of highest intensities contribute to HHG. This reduction of the HH source volume compared to the focal size of the IR driver leads to an increased divergence of the HH beam as observed.

The elliptical shape of the HH beam profile is the result of an astigmatic focusing geometry. The IR beam is focused by a concave mirror with a 4 m radius that reflects the driver pulse at incidence angles of 16 mrad (horizontally) and 0 mrad (vertically). The IR beam passes through the meridional and the sagittal focus before it enters the gas cell, the foci being placed at a distance of ≈2-4 mm from the cell entrance aperture. This upstream focusing geometry is known to yield the best HHG efficiency. The geometry implies that HHs are generated closer to the sagittal than the meridional focus, where the astigmatic beam is horizontally elongated. The HH source volume is therefore more strongly confined in the vertical than in the horizontal direction. Gaussian beam propagation results in a larger far-field divergence in the vertical direction and a smaller in the horizontal direction, leading to the observed elliptical beam profile.

Figure 13:
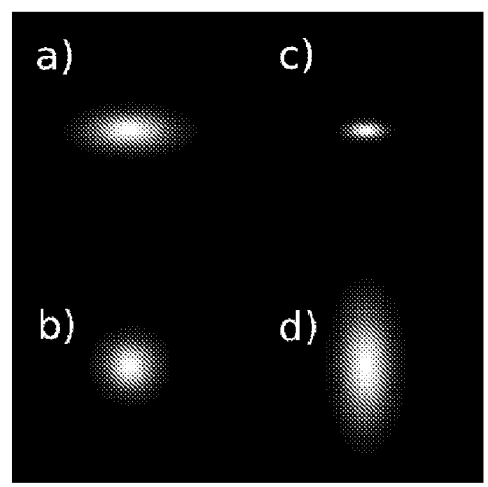
FIG. 13 shows the simulated effect of the astigmatic driver beam geometry on the HH beam due to the non-linear nature of HHG. Astigmatic driver beam intensity profiles are shown for the sagittal focus plane (a) and for the far field (b). Raising the intensity profile (a) to the 5 power (c) leads to an elliptical far field intensity distribution (d).

The qualitative discussion of the beam profile is confirmed by the results of a numerical beam propagation simulation, illustrated in FIG. 13. Images (a) and (b) show intensity distributions of a simulated astigmatic beam close to the sagittal focus (a) and in the far field (b). The beam is simulated by introducing an astigmatic phase to a flat field Gaussian beam using a second order Zernike polynomial (M. Born and E. Wolf, *Principles of Optics*, Cambridge University Press, 1998) and propagating the focused beam through the focal region using the LightPipes software package (G. Vdovin, H. van Brug, and F. van Goor, Proc. SPIE 3190, 82 (1997)). The far field intensity distribution is round as expected, because the larger divergence of the beam in the vertical plane after the focus is compensated by the astigmatic phase distribution. A HH beam is simulated by keeping the phase profile of the IR beam and raising the beam intensity to the 5 power. This procedure reflects the correspondence between the spatial phase profile of the IR beam and the HH beam and accounts for the non-linear interaction leading to HH generation, which is expected to scale approximately with the 5 power of the driving IR intensity. The sagittal focus profile of this beam is shown in FIG. 13c. After propagating the same distance as the beam in FIG. 13a,b, the simulated HH beam emerges with a vertically elongated shape (FIG. 13d) as is observed in the experiment.

This example demonstrates that the VUV beam profiler provides detailed information on the HHG source conditions and the HH beam propagation. This information is vital for the design of experiments that employ this novel class of light sources and for establishing reproducible light source conditions in day-to-day operations.

Figure 14:
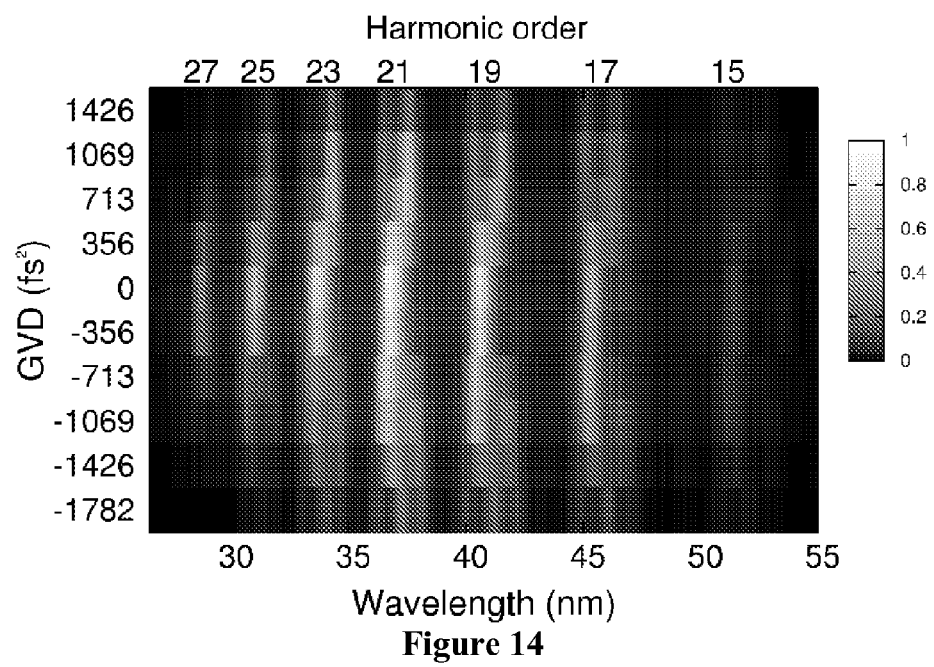
FIG. 14 shows the HH spectra of the VUV beam generated at the same conditions as in FIG. 8, but for a variety of temporal chirps of the laser amplifier. The chirps are indicated on the vertical axis in terms of induced group velocity dispersion (GVD). HH spectra of the VUV beam generated at the same conditions as in FIG. 8, but for a variety of temporal chirps of the laser amplifier. The chirps are indicated on the vertical axis in terms of induced group velocity dispersion (GVD).

Operation of the spectrometer is demonstrated by recording a series of HH spectra generated by driving laser pulses with varying spectral chirps (FIG. 14). The chirp is modified by adjusting the position of one of the gratings in the compressor stage of the chirped-pulse laser amplifier system, while keeping the pulse energy constant. The HH spectrum is changing significantly as the spectral chirp is varied. The shapes of individual peaks are changing from a three peak structure at large negative chirps to a single intense peak at near-zero chirps. For large positive chirps, the harmonic peaks are split again, exhibiting double-peak structures.

Figure 15:
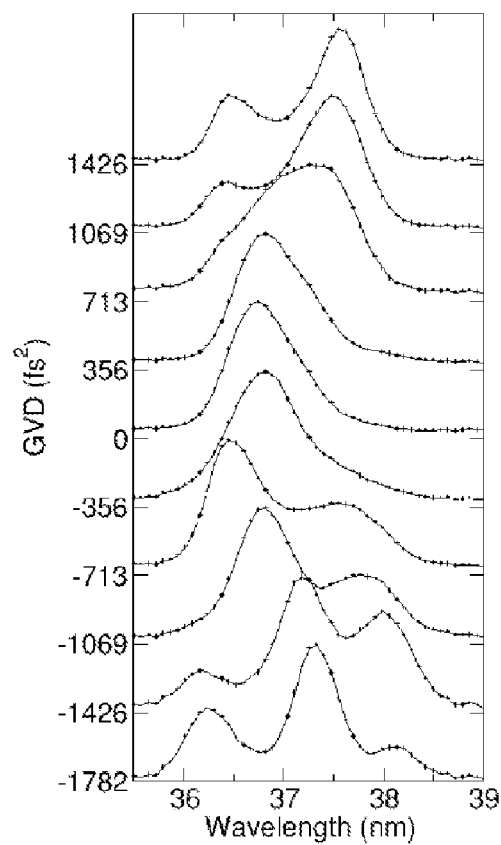
FIG. 15 shows the spectral shape of the 21 harmonic as a function of GVD. The spectra are normalized to equal maximum intensity. The values and tick marks at the ordinate indicate the GVD for the corresponding spectra and the baseline positions

A detailed picture of the driver chirp dependence of the HH spectrum can be seen in FIG. 15, which shows a waterfall representation of the data of FIG. 14 for the wavelength range of the 21 harmonic. The solid circles correspond to the camera pixels covered by the 21 harmonic and the group velocity dispersion (GVD) values are given on the left next to the base lines of the corresponding spectra. To guide the eye, the circles are connected by lines. FIG. 15 demonstrates that spectral features spaced by less than a nanometer can easily be resolved by the spectrometer. In fact, the shapes of the peaks are not determined by the spectrometer resolution but by the HH generation conditions. In all spectra the separation of features ranges from 1.0 to 1.3 nm.

It is known that variation of the spectral chirp of the driving laser pulse leads to spectral shifts and broadening of individual HH peaks. The relation between HHG and the fundamental pulse chirp has previously been studied by several groups. These works mostly concentrate on the positions of the HH peaks and their width but do not discuss the splitting, even though it is observed experimentally and appears in theoretical calculations of the single-atom response in HHG.

Recently, the structure of HH spectra has been theoretically analyzed by Liu and co-workers (C. D. Liu et al., Opt. Express 17, 10319 (2009)). Their calculations predict that interference effects between several quantum paths lead to a strong dependence of the HH spectrum on the spectral chirp of the IR driver pulse including the splitting of single harmonic peaks. It is shown that HHG involves contributions from several electron recollisions including short and long trajectories as well as second, third and higher order recollisions that occur when the electron does not recombine on the first passage of the core. The spectrum of HH radiation is determined by constructive interference of photons produced during all half-cycles of the femtosecond driver pulse that have sufficient intensity to generate photons of a certain energy. In the case of zero driver pulse chirp, contributions from similar trajectories of all consecutive half-cycles have equal phase shifts and thus the phase-matching is achieved for exact odd harmonics of the fundamental frequency of the driver pulse.

For chirped driver pulses the phase shifts gradually change from half-cycle to half-cycle. This induces interferences between contributions from different trajectories and leads to modulations in the HH spectra similar to those shown in FIGS. 14 and 15.

6 Summary

A compact device is presented, that allows for fast, non-intrusive in-situ characterization of the photon energy spectrum and the spatial beam profile of laboratory-scale VUV light sources. The entire unit is mounted on a standard DN200 CF vacuum flange. The in-vacuum size of the device is less than 200 mm×200 mm×100 mm. Performance of the apparatus is demonstrated by analyzing the beam profile and the photon energy spectrum of a femtosecond high-order harmonic generation light source. An astigmatic focusing geometry of the IR driver pulse results in an elliptical VUV beam profile in agreement with numerical simulations of coherent beam propagation effects. Strong dependence of the VUV spectrum on the spectral chirp of the IR driver is demonstrated. The observed splitting of peaks in the high harmonic spectrum is in qualitative agreement with recent theoretical predictions that ascribe variations of the VUV spectrum to quantum interferences between different electron trajectories in the strong-field driven high-order harmonic generation process.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

We claim:

1. An apparatus for characterizing a photon beam comprising:
   a movable stage,
   a transmission grating configured to diffract the photon beam into a diffracted photon output,
   an image detector configured to detect the diffracted photon output,
   a reflective surface, and
   an image recorder, wherein the transmission grating, the image detector, and the reflective surface are each connected to the movable stage, wherein the movable stage is configured to be positioned in a first position and a second position, wherein in the first position the photon beam bypasses the apparatus, and wherein in the second position the photon beam contacts the transmission grating.

2. The apparatus of claim 1, wherein the apparatus is an in-vacuum apparatus.

3. The apparatus of claim 1, wherein the image detector comprises a multi-channel plate (MCP) and a phosphor screen, wherein the phosphor screen is configured to convert the diffracted photon output into a visible image.

4. The apparatus of claim 1, further comprising:
   a vertical slit aperture whereby the photon beam passes through the vertical slit aperture prior to contacting the transmission grating.

5. The apparatus of claim 1, wherein the movable stage is configured to be movable relative to the photon beam in two directions in at least one dimension.

6. The apparatus of claim 5, wherein the apparatus is configured to be in a vacuum, and wherein the movable stage is configured to be controlled from outside the vacuum.

7. The apparatus of claim 5, wherein the movable stage is a piezo driven linear stage.

8. The apparatus of claim 3, wherein the image recorder is configured to record the visible image.

9. The apparatus of claim 8, wherein the image recorder is a camera.

10. The apparatus of claim 1, wherein the reflective surface is positioned such that the reflective surface directs the visible image to the image recorder.

11. The apparatus of claim 1, wherein the reflective surface is a mirror.

12. A vacuum assembly comprising a vacuum chamber, a light source, and the apparatus of claim 1, wherein the apparatus is located in the vacuum chamber.

13. The apparatus of claim 1, wherein the movable stage is further configured to be positioned in a third position, wherein in the third position the photon beam bypasses the transmission grating and contacts the image recorder.

14. A method for characterizing a photon beam, comprising:
   (a) generating the photon beam,
   (b) providing an apparatus, the apparatus comprising:
      a movable stage,
      a transmission grating configured to diffract the photon beam into a diffracted photon output,
      an image detector configured to detect the diffracted photon output,
      a reflective surface, and
      an image recorder, wherein the transmission grating, the image detector, and the reflective surface are each connected to the movable stage,
   (c) moving the movable stage from a first position where the photon beam bypasses the apparatus into a second position where the photon beam contacts the transmission grating, and
   (d) recording the diffracted photon output from the transmission grating with the image recorder.

15. The method of claim 14, further comprising:
   (e) moving the movable stage to a third position where the photon beam bypasses the transmission grating and contacts the image recorder.

* * * * *